United States Patent
Cohen et al.

(10) Patent No.: US 7,310,677 B1
(45) Date of Patent: Dec. 18, 2007

(54) RESOLVER SERVICE FOR MAKING DECISIONS AT RUN-TIME IN A COMPONENTIZED SYSTEM

(75) Inventors: Yaniv Cohen, Rosh-Haain (IL); Eylon Steiner, Ra'anana (IL); Boaz Sapir, Tel Aviv (IL); Barak Hershkovitz, Kfar Saba (IL)

(73) Assignee: SAP Portals Israel Ltd., Ra'anana (IL)

( * ) Notice: Subject to any disclaimer, the term of this patent is extended or adjusted under 35 U.S.C. 154(b) by 738 days.

(21) Appl. No.: 10/741,190

(22) Filed: Dec. 18, 2003

Related U.S. Application Data

(60) Provisional application No. 60/435,428, filed on Dec. 20, 2002.

(51) Int. Cl.
G06F 15/16 (2006.01)

(52) U.S. Cl. .................. 709/229; 709/227; 709/226; 709/219; 709/216; 705/2; 705/9; 705/1; 707/2; 707/3; 707/104.1; 707/101; 701/29

(58) Field of Classification Search ........... 709/229, 709/227, 226, 219, 216, 225, 246; 705/2, 705/9, 1; 707/2, 3, 104, 101; 701/29
See application file for complete search history.

(56) References Cited

U.S. PATENT DOCUMENTS

2002/0052954 A1* 5/2002 Polizzi et al. ............... 709/225
2002/0161831 A1* 10/2002 Nakaoka et al. ............ 709/203
2002/0198758 A1* 12/2002 Sawa et al. ..................... 705/9
2003/0182240 A1* 9/2003 Eda et al. ...................... 705/64
2004/0088183 A1* 5/2004 Nakanishi et al. .............. 705/1
2006/0031407 A1* 2/2006 Dispensa et al. ............. 709/219

* cited by examiner

*Primary Examiner*—Ario Etienne
*Assistant Examiner*—Barbara Burgess
(74) *Attorney, Agent, or Firm*—Buckley, Maschoff & Talwalkar LLC

(57) ABSTRACT

A method for operating a portal system includes providing a first instruction that is operable to cause the portal system to behave in a first way. A second instruction that is operable to cause the portal system to behave in a second way is provided. A first condition is defined using an editor. The first condition is associated with the first instruction. A request from a client system is received at the portal system for a session to access the portal system, the request being associated with given user information. Whether or not the first condition is satisfied is determined using the user information associated with the request. The portal system is caused to behave in the first way according to the first instruction if the first condition is satisfied, wherein the portal system behaves in the first way for the entire session.

11 Claims, 9 Drawing Sheets

RESOLVER SERVICE FOR MAKING DECISIONS AT RUN-TIME IN A COMPONENTIZED SYSTEM

CROSS-REFERENCES TO RELATED APPLICATIONS

The present application claims priority to U.S. Provisional Patent Application No. 60/435,428, filed on Dec. 20, 2002, which is incorporated by reference.

BACKGROUND OF THE INVENTION

The present invention relates to a client-server system. More particularly, the embodiments of the present invention relate to methods of using certain rules to provide customized information to users in an enterprise portal environment, which is one type of client-server systems.

Computer networks have become ubiquitous in business, industry, and education. Much research has been conducted on ways to better provide information to users more quickly and efficiently. In one approach, a network is configured with one or more user accounts. Each account is uniquely associated with a human network user or host computer. The network also has one or more resources, such as application programs that provide various computing functions that are available to all users. In this approach, a user logs into his or her user account and selects a desired application. This approach does not provide a means of tailoring of the information provided to the user or providing different access rights to the network resources.

Development and wide acceptance of the Internet have enabled network resources, accounts and applications to become available from almost anywhere in the world and at virtually anytime. The Internet is most commonly used in the World Wide Web ("The Web") environment. The Web uses the hypertext protocols to present information, which greatly simplifies the information retrieval by users.

These developments have enabled networks to serve as a platform for global electronic commerce, as seen by the rise of Yahoo!, EBay and Amazon.com. The Web also enables easy exchange of information between businesses and their customers, suppliers and partners.

Businesses of any significant size now see the Internet and effective use of computers as crucial to their business strategies. This has led to a great demand for business or enterprise applications that are used to better organize, store, and process data. Increasingly, these enterprise applications are being provided in portal environment. One example of the enterprise portal is mySAP.com™ by SAP, AG, a German software company.

BRIEF SUMMARY OF THE INVENTION

Embodiments of the present invention use predefined rules to control the behavior of the portal. The rules includes conditions and instructions. The conditions are defined by in CONDITION tags of XML in one implementation. Appropriate instructions are selected according to the defined conditions during runtime. The instructions include any thing that is executed to affect the behavior or a server or portal. These instructions may be in HTML, a configuration setting, and the like.

Accordingly, the present embodiments relate to a resolver service that is used to control the behavior of a server or portal. The resolver service uses a specific semantic editor for creating conditions, and a parser or runtime-decision-making mechanism that resolves them regardless of the semantic meaning of the condition's parameters. The mechanism receives prioritized conditions in a specified format, such as XML, and a list of [name, value] tuples to be used in the context of these conditions.

The resolver service returns a set of [name, value] according to the XML condition. The XML can be created by the editor, which creates a meaningful condition for the required application. An application that needs a run-time decision making mechanism can use the semantic editor to create conditions and results for the application.

As used herein, the term "condition" is generally used to refer to as conditions or rules that are defined by the editor during the design time. The term "instructions" is generally used to refer to anything may be used to affect the behavior of the portal during the runtime, as explained further below. These two terms are defined as such herein merely for purposes of differentiating the two in order to avoid confusion.

In one embodiment, a portal administrator defines a set of conditions that determines which portal desktops (a portal object combining selected framework pages with portal themes) are assigned to end users at runtime, which enables organizations to allocate portal desktops with varying designs, branding, or layouts to different departments, sub-companies, or platform-specific scenarios. Display rules definitions are transparent to end-users. At logon, users are seamlessly presented with the appropriate portal desktop assigned to their role, group, user or scenario. The following provides exemplary scenarios that may require the need for alternative portal desktops: (1) internal employees vs. external customers and partners, (2) users accessing the portal through a dial-up connection (requiring a thin client desktop) vs. broadband connections, and (3) sub-companies belonging to the same organization (requiring different company branding in the portal header).

In one embodiment, a method for presenting information to a plurality of client systems that are coupled to an enterprise portal includes receiving at the portal a request from a first user associated with a first client system; determining whether or not the request satisfies predefined first an second conditions; and modifying a behavior of the portal according to a first instruction if the request satisfies both the first and second conditions, wherein the portal presents a plurality of portal pages to the first user according to the first instruction.

In one embodiment, a portal system for providing customized portal pages to clients includes means for receiving at the portal a request from a first user associated with a first client system; means for determining whether or not the request satisfies predefined first an second conditions; and means for modifying a behavior of the portal according to a first instruction if the request satisfies both the first and second conditions, wherein the portal presents a plurality of portal pages to the first user according to the first instruction.

In another embodiment, a method for operating a portal system includes providing a first instruction that is operable to cause the portal system to behave in a first way. A second instruction that is operable to cause the portal system to behave in a second way is provided. A first condition is defined using an editor. The first condition is associated with the first instruction. A request from a client system is received at the portal system for a session to access the portal system, the request being associated with given user information. Whether or not the first condition is satisfied is determined using the user information associated with the request. The portal system is caused to behave in the first way according to the first instruction if the first condition is satisfied, wherein the portal system behaves in the first way for the entire session. The portal system is caused to behave in the second way according to the second instruction if the first condition is not satisfied, wherein the portal system behaves in the second way for the entire session.

In yet another embodiment, a computer readable medium includes a computer program for portal system operation. The computer program comprises code for defining a first condition using an editor; code for associating the first condition to a first instruction, the first instruction being operable to cause the portal system to behave in a first way; code for receiving a request from a client system at the portal system for a session to access the portal system, the request being associated with given user information; code for determining whether or not the first condition is satisfied using the user information associated with the request; and code for causing the portal system to behave in the first way according to the first instruction if the first condition is satisfied, wherein the portal system behaves in the first way for the entire session. The program further comprises code for causing the portal system to behave in a second way according to a second instruction if the first condition is not satisfied, wherein the portal system behaves in the second way for the entire session

DETAILED DESCRIPTION OF THE INVENTION

The present invention is directed to a resolver service for a client-server computer system. The resolver service resolves or makes decisions that effects the presentation of information to the client. Merely for illustrative purposes, the present invention is described in a portal setting. Accordingly, the resolver service is described herein as a portal service that provide information to users according to predefined rules. The portal service or resolver service is configured to make decisions quickly during run time as to what information is to be displayed to given users or how to display particular information, or both. The decisions made by the resolver service affects the behavior of the portal system.

A portal serves as a gateway to information sources to one or more users. By definition, the portal is provided in a client-server environment or system that distributes the workload of a computer application across a plurality of cooperating computer programs. This type of computing separates user-oriented tasks, application tasks, and data management tasks. That is, these three types of tasks or functions are distributed to different layers: the presentation, application, and database layers. Generally, each layer has one or more software programs dedicated to provide services to their respective layers.

Figure 1A:
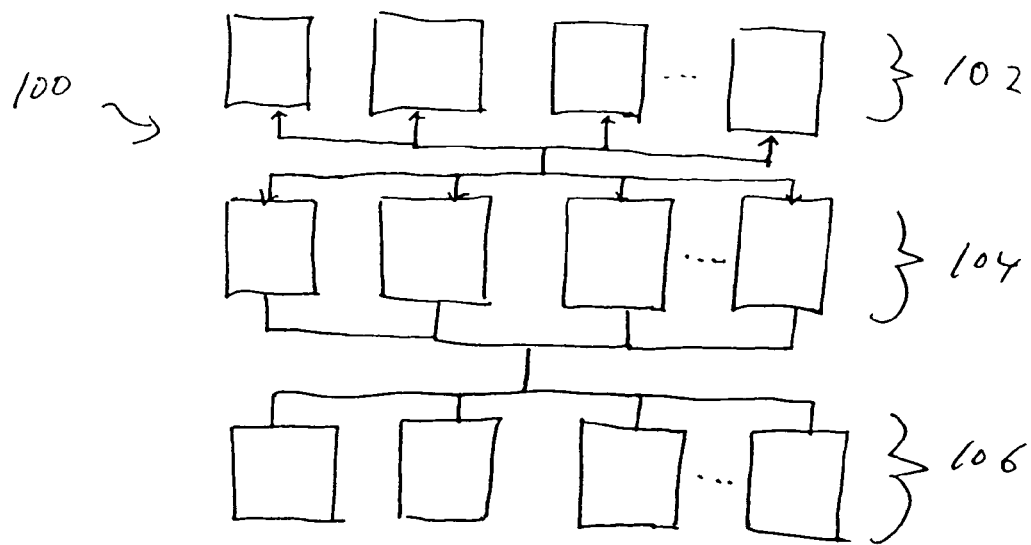
FIG. 1A illustrates a client-server system including a presentation layer, application layer, and database layer according to one embodiment of the present invention.

FIG. 1A illustrates a client-server system 100 including a presentation layer 102, an application layer 104, and a database layer 106 according to one embodiment of the present invention. Each layer has one or more servers that are primarily dedicated to provide functions relating to that layer. The system 100 illustrates a three-tier client-server system; however, a two-tier client-server system or multi-layer cooperative client-server system may also be used to implement the embodiments of the present invention.

The above three layers represent functional groups in the system 100. Each group is configured to support the demands of its functions. The database layer includes database servers that are primarily utilized to read or write data to and from storage locations. These storage locations may be provided in one or more storage subsystems that are linked to the database servers via a communication network, e.g., network attached storage (NAS) or storage area network (SAN). The application layer includes servers that contain the processing logic of the system, including services such as spooling, dispatching user requests, and formatting data. The presentation layer has servers that are primarily configured to perform tasks relating to presentation of the data. Each of these layers generally handle data differently so interfaces are needed to facilitate communication among them. Application layer serves as an intermediary between the presentation and database layers. The application layer and database layer, in turn, communicates with each via a middleware.

Figure 1B:
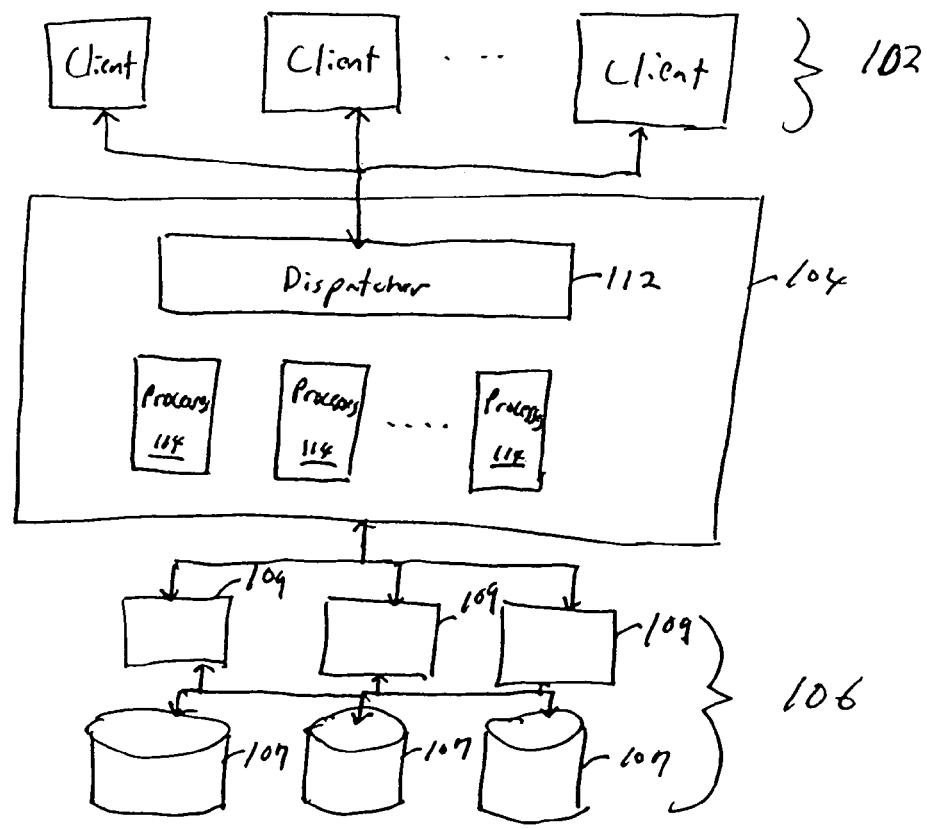
FIG. 1B illustrates a schematic interactions between the three functional layers according to one embodiment of the present invention.

FIG. 1B illustrates a schematic interactions between the three functional layers. In the present embodiment, the application layer is implemented using SAP R/3. The application layer 104 receives the data or requests inputted by users using client systems, which are part of the presentation layer 102. The data received is converted to a format that is compatible with the application logic residing in the application layer. The data is then sent to a dispatcher 112.

The dispatcher is a control program that manages the resources of the applications residing in the application layer. The dispatcher initially keeps the requests in queues and processes them one by one. The dispatcher sends the requests to those work processes 114 that have sufficient resources to handle the requests. The work processes are services offered by the application servers (or services requested by a client).

Each work process executes the received request. This may involve accessing a database 107 in the database layer 106 to retrieve needed data. As understood by those skilled in the art, the database layer 106 generally includes a plurality of databases 107 and a plurality of database servers 109. Once the request has been executed, the work process sends resulting data to the dispatcher that, in turn, forwards it to the presentation server. The work process generally transforms the data received from the database 107 using application logic. Upon received the transformed or processed data, the presentation layer displays the data in a user-friendly format.

Figure 2:
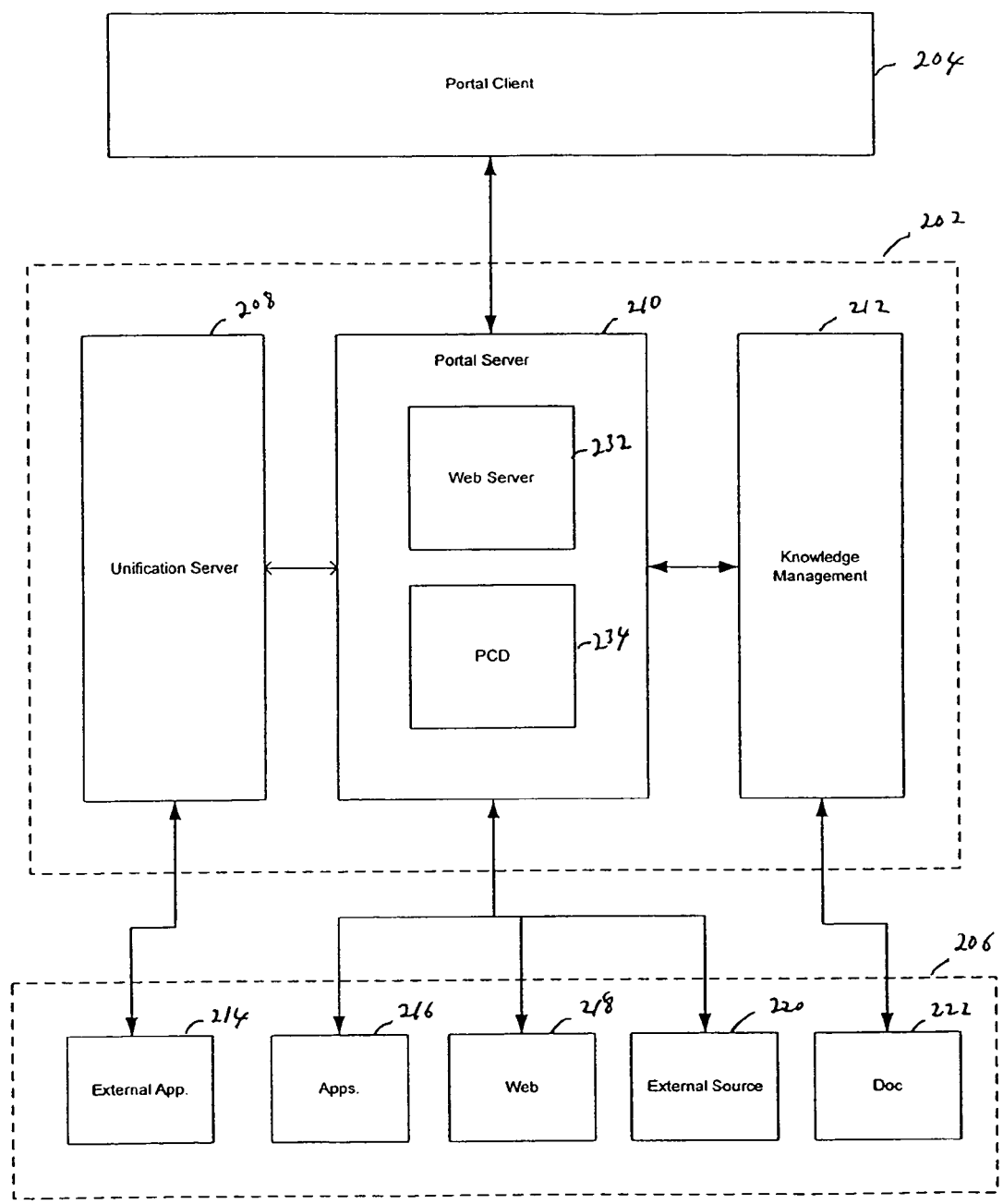
FIG. 2 illustrates an enterprise portal system according to one embodiment of the present invention.

FIG. 2 illustrates an enterprise portal 202 that couples a client 204 to a plurality of information sources 206 according to one embodiment of the present invention. The client 204 may be a personal computer (PC) that is linked to the portal 202 via the Internet, intranet, wide area network, local area network, or the like. The portal is configured to provide users with a common entryway to various applications and information.

The portal system acts as a middleware program that converts the data and reports from the variety of backend databases and presents the data to a user in a standardized format. Data is provided to users by the portal system in a format that is readable by a browser program, e.g., Internet Explorer™. By allowing a user to use a standard and familiar browser program as a user interface, the user's learning curve for the portal is greatly reduced.

In addition to converting data from backend databases into a standardized format for a user, the portal system may be configured to ran predefined jobs to process data. These jobs are stored within the portal system in a computer memory device called a repository. These jobs can perform a variety of tasks, e.g., retrieving data from a backend database, preparing a report using the retrieved data, processing data already residing within the portal system, or notifying a user when a particular condition occurs within the portal system. These jobs can be executed on a pre-defined schedule or on an ad-hoc basis at the request of a user.

The portal system presents data to a user in an object called a portal page. The portal page is an object arranged in a format that is readable by a browser program. The portal page is a highly configurable document that may be comprised of a plurality of modules called portal objects. Each portal object may contain a set of links corresponding to output reports, jobs, or other objects stored within the repository.

Thus, by clicking on one of the links in a portal object, the portal system will process the object corresponding to that link. If the link is directed to a job stored within the portal system, then clicking on that job will cause the job to be executed. If the link is directed to a browsable object stored within the repository, then that object will be displayed to the user.

A portal page may also include a display window that can display browsable objects to a user. Another feature of the portal page is a dynamically updated portal object. A dynamically updated portal object is an object that is updated on the user's portal page based upon data stored in the portal system. If a dynamically updated portal object is included within a user's portal page, the user may receive the latest information corresponding to that object by refreshing his portal page. For example, if the dynamically updated portal object is linked to the output report of a job, then the portal object will display the latest version of the output report to the user when the portal page is refreshed. A dynamically updated portal object may also be hyperlinked to its corresponding object in the portal system such that a user may view, edit, or execute the corresponding object by clicking on the dynamically updated portal object at the user interface.

In the present embodiment, the portal 202 integrates a plurality of different technologies, enabling users to access applications and information that are both internal and external to the enterprise. The information sources 206 include an external application 214, internal application 216, external document source 218, internal document source 220, and Web 222.

The portal includes a unification server 208, a portal server 210, and a knowledge management 212. The unification server is configured to provide a business unification layer that enables dynamic integration of both applications and information from various sources. The business unification layer enables the creation of a unified object model, so that a portal user may dynamically integrate applications and information. Logical business objects, provided in component systems, are used to create a unification object model that is stored in a repository. The objects are mapped to each other by links, so that users are able to dynamically pass content from one information source to another.

The logical business objects are used to represent a thing, concept, process or event in operation, management, planning or accounting of an organization. Each business object specify attributes, relationships, and actions/events. For example, the business objects may be used to represent purchase orders, vendors, and users of a system.

The portal server includes a web server 232 that communicates with the client and a portal content directory (PCD) 234 that includes a plurality of presentation components, e.g., iViews. The PCD is a file-based directory that also includes roles and the systems with which the portal is to interact. In one implementation, the PCD runs on a Java 2 Enterprise Edition™-compliant application server.

The knowledge management (KM) 210 is a set of services for managing knowledge and collaboration. The KM 210 provides a platform to harmonize various business tools under one business management platform regardless of the physical location of data. In one implementation, the KM includes a repository framework that manages the content of documents and corresponding document attributes, classification engine that organizes contents in folder or tree structures, and other components for managing information.

Figure 3A:
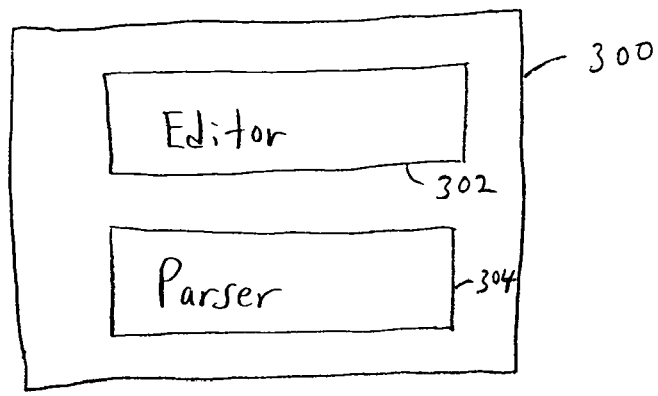
FIG. 3A illustrates a revolver service including an editor and parser according to one embodiment of the present invention.

FIG. 3A illustrates a resolver service 300 including an editor 302 and a parser 304. The resolver service enables components in the portal system to make runtime decisions. The resolver service is stored in the PCD 234 of the portal 202 in the present embodiment.

The editor 302 is a design time component and is used during design time to define the conditions for selecting appropriate instructions to the portal during runtime. The instructions are used to control the portal behavior in presenting information to the client 204. The behavior includes what information is displayed, what access is allowed, how the information is displayed, and the like.

The parser 304 is a runtime component and parses the conditions during the runtime to retrieve appropriate instructions for controlling the behavior of the portal. The runtime component or service is an actual portal service that evaluates the conditions defined by the editor.

Figure 3D:
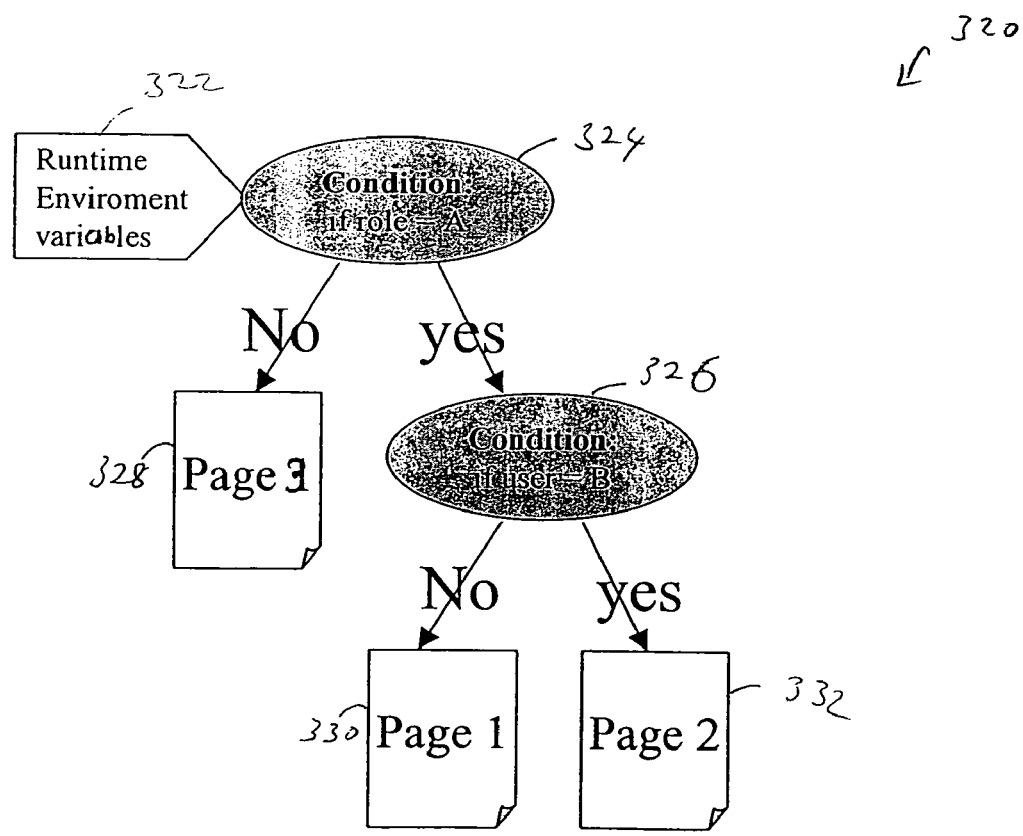
FIG. 3D illustrates a process flow of the resolver service during the runtime according to one embodiment of the present invention.
Figure 3B:
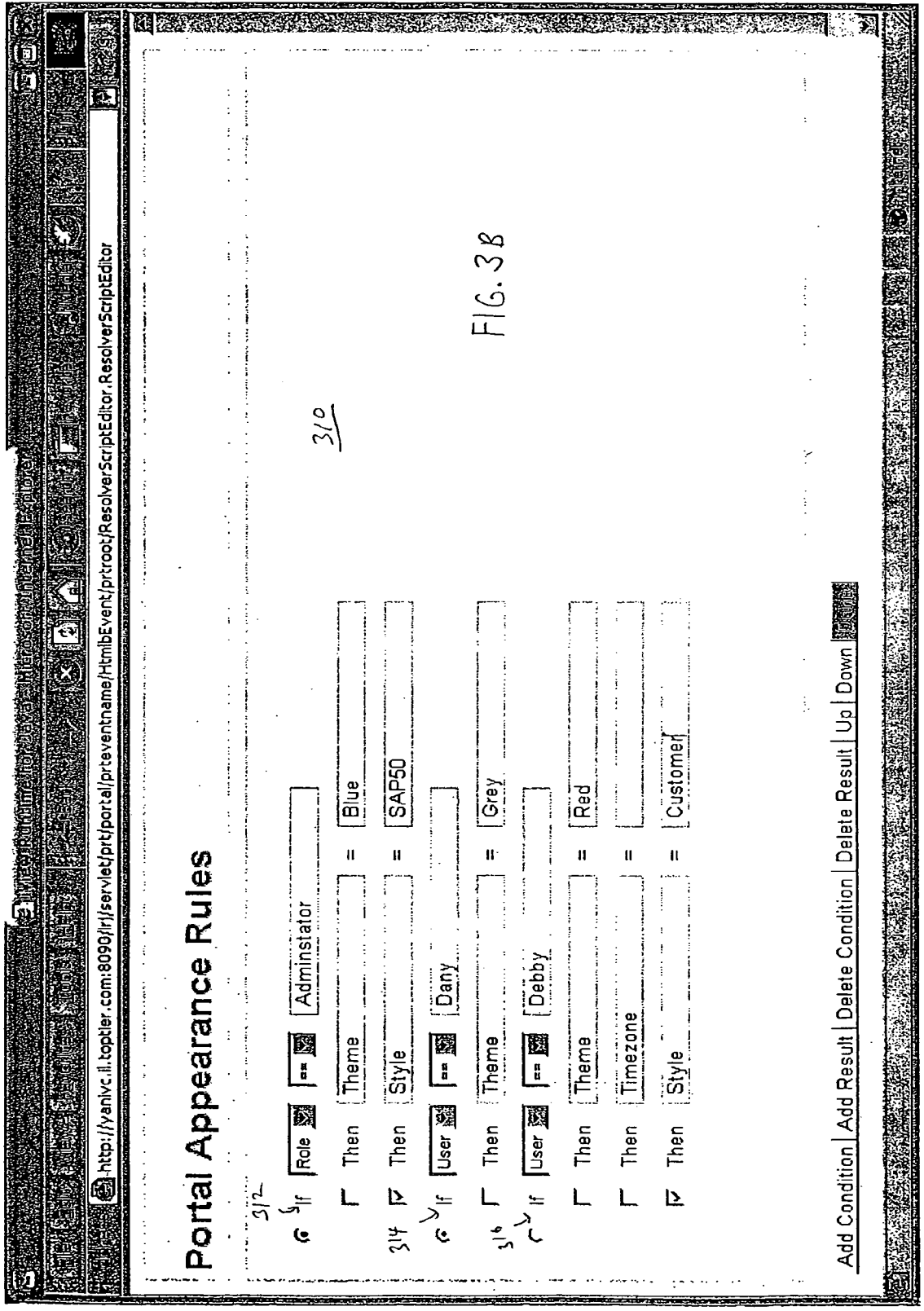
FIG. 3B illustrates a user interface provided by an editor of the resolver service according to one embodiment of the present invention.

FIG. 3B illustrates a user interface 310 provided by the editor 302 according to one embodiment of the present invention. One or more conditions 312, 314, and 316 are defined using the interface 310. In one embodiment, the conditions are prioritized according to the order presented. That is, the condition 312 is checked first and then the condition 314 is checked.

The parser 304 checks the role of the user first, i.e., the condition 312. If the role of the user is an administrator, then "SAP50" is used as the style. Then the parser checks the identity or name of the user. If the user's name is Dany, then a gray theme is used for all portal pages that are displayed to the user for this session. The effects associated with "then" portions of the XML tag are performed by instructions. For example, the "grey theme" in XML is mapped to particular instructions stored in the portal that causes the portal to provide "grey theme" to Dany.

Accordingly, the resolver service defines the behavior of the portal and how it interacts with the user. In one embodiment, the conditions are defined using an XML script. This allows for easy customization of certain components in the portal system that determine the way the system behaves according to role, group, user or any other property the component wishes to use in order to determine its behavior.

Figure 3C:
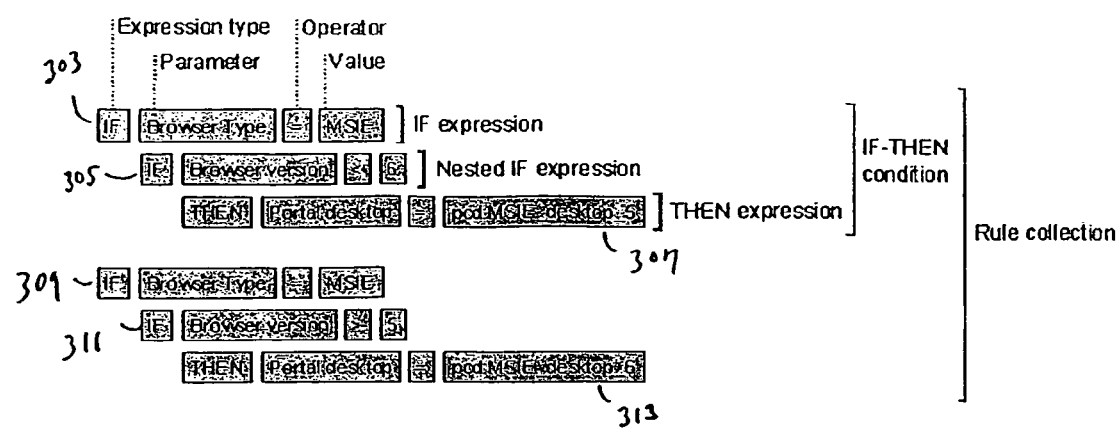
FIG. 3C illustrates exemplary conditions that may be used in a user interface of the editor of FIG. 3B.

FIG. 3C illustrates a plurality of conditions that may be used in a user interface of the editor according to one embodiment of the present invention. These conditions are checked at runtime based on information associated with the user request. Such information includes names of users, groups, roles, connection bandwidth, device types used by the user, browser types, and browser versions. In the present embodiment, a primary condition 303 and its nested condition 305 are defined so that a first portal desktop 307 is provided to the user if both the browser type and version specified by the conditions 303 and 305 are satisfied. Similarly, a primary condition 309 and its nested condition 311 are defined so that a second portal desktop 313 is provided to the user if both the browser type and version specified by the conditions 309 and 311 are satisfied.

FIG. 3D illustrates a process flow 320 of the resolver service during the runtime according to one embodiment of the present invention. During the runtime, the portal receives a request to access the portal from a client or user. From the request, the resolver service obtains certain user specific information or runtime environment variables (step 322). The parser checks the first condition using the runtime environment variables (step 324). The first condition relates to the role of the user.

In the present embodiment, the role defines includes a collection of tasks, services, and information associated with a specific group of users. The role definition may determine user access to content, the activities that the user can perform, how the contents are visualized, and the navigation structure within the portal. Various roles may be defined according to a particular situation and needs of a business.

If the first condition is satisfied, i.e., the role of the user matches the predefined role, then the second condition is checked (step 326). The second condition determines the user's name or identity. If the user is identified as a user B, then a portal page 2 is displayed (step 332). If not, the portal page 1 is displayed (step 330). Referring back to the first condition, if the condition is not satisfied, then a portal page 3 is displayed (step 328).

In the present embodiment, the identity of the user is further checked to provided even more customized presentation of information. That is, the first condition may be seen as a coarse (or general) customization and the second condition may be seen as a fine (or more specific) customization.

In the present embodiment, the portal pages 1, 2, and 3 correspond to how the information is displayed or how the portal behaves with respect to the user. For example, if the user is presented with the portal page 1 that has a desert theme and has two columns, then all subsequent pages presented to the user have these features. Similarly, the features associated with the portal page 2 or 3 are maintained in subsequent portal pages presented to the users.

The resolver service may also be used to control the contents being presented to the users. For example, in FIG. 3D, the first condition checks to see if the user requesting the access to the portal is an administrator. If this condition is satisfied, then the user is provided with full access to the portal system, including the ability to modify the system configuration setting. If the first condition is not satisfied, then the user is allowed limited access to the portal. The second condition is used to further customize the information presented or accessed granted to the user. Different administrators may be different levels of access or security clearance.

An example of the rules defined by the editor 302 is provided below. In the present embodiment, XML is used to define the rules.

```
<?xml version="1.0" encoding="utf-8"?>
<CONDITION>
    <IF value="user-=yaniv1">
        <RETURN name="color" value="red"></RETURN>
        <RETURN name="theme" value="office"></RETURN>
    </IF>
    <IF value="user==yaniv">
        <RETURN name="color" value="green"></RETURN>
        <RETURN name="theme" value="sky"></RETURN>
    </IF>
</CONDITION>
```

In the above code, the "IF" tag describes a simple condition. Examples of such conditions include "role=admin", "user!=Jhon", "numberOfUsers<10", etc. In one implementation, the conditional expression following "value=" might be of the form:

[key [Operator {<, >, !=, ==}]key]

Some implementations might also allow other operators, such as OR and AND. If the value is "true", the parser or runtime service will check the child element of the "IF" tag, otherwise it will go to its next sibling element.

The "RETURN" tag represents a value that should be returned with any other values that were already collected from other RETURN tags. A RETURN tag's properties are [name, value] tuples indicating the name of the key that the value property represents and the actual value returned, respectively.

When the parser reaches a RETURN tag, it collects values from the RETURN tags of the entire siblings of the first RETURN tag it reached. It then stops the execution and returns the mapped value back to the user.

At runtime, the variables are sent to the resolver service, which return the page ID to be used. Examples of variables are Group, User, Role and/or Device.

In a Java™ implementation, a return value is returned as a Map(Java Interface) of name→values. The resolver service itself needs only one method: resolve. The resolve method receives the XML and a Map(Java interface) of name→values or name→Set(Java interface) of Strings. The Set allows a name to have more than one value when it is evaluated.

Each time the service parses a condition, it takes the left part of the condition, and checks whether it has a matching name in the Map that was passed to it. If the map holds such a name, the name is replaced by its value, or values, and then the condition is evaluated. If the result is "true", the resolver collects the return values and returns them as a Map. If not, the resolver will simply continue to the next condition.

Figure 4A:
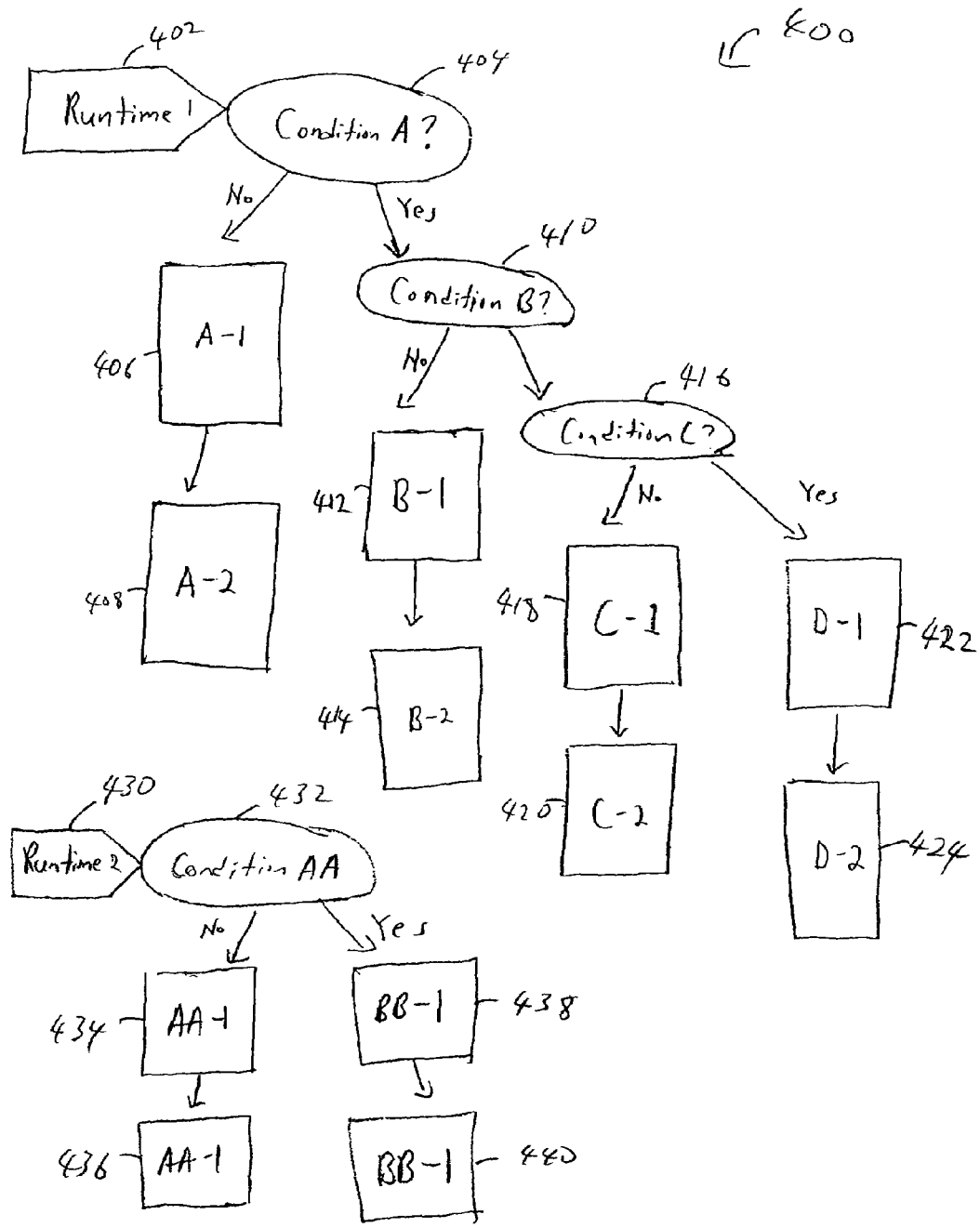
FIG. 4A illustrates a process flow of the resolver service during the runtime according to another embodiment of the present invention.

FIG. 4A illustrates a process flow 400 of a resolver service according to another embodiment of the present invention. At runtime, the parser 304 checks to see if the condition A is satisfied using the variables associated with a request received from a user (steps 402 and 404). If the condition A is not satisfied, then instruction A is used to control the behavior of the portal for this particular session. The condition A is defined in XML using the editor 302. The instruction A may be any instruction to the portal system. The instruction A may be HTML that defines the layout of the portal page, security access instructions, or the like. The portal then interacts with the user according to instruction A (steps 406 and 408). That is, the portal pages A-1 and A-2 are presented to the user according to the instruction A.

At step 404, if the condition A is satisfied, the condition B is then checked (step 410). If the condition B is not satisfied, the portal interacts with the user according to instruction B. That is, the portal pages B-1 and B-2 are presented to the user according to the instruction B (steps 412 and 414).

If the condition B is satisfied, then the condition C is checked (step 416) Portal pages C-1 and C-2 are displayed to the user according to instruction C if the condition C is not satisfied (steps 418 and 420). Portal pages D-1 and D-2 are displayed to the user according to instruction D if the condition C is satisfied (steps 422 and 424).

After checking the conditions A, B, and C, the process checks the condition AA (steps 430 and 432). The condition AA is a sibling condition to the condition A, whereas the conditions B and C are child and grand child conditions. If the condition AA is not satisfied, instruction AA is used in conjunction with instruction A, B, C, or D that has been selected above (steps 434 and 436). Portal pages AA-1 and AA-2 are presented to the user using both instruction AA and instruction A, B, C, or D. If the condition AA is satisfied, instruction BB is used in conjunction with instruction A, B, C, or D, so that portal pages are displayed using both instruction BB and instruction A, B, C, or D (steps 438 and 440).

In the present embodiment, the conditions A, B, and C may be a user group, a user name, user role, type of device, type of browser, and the like. These conditions are defined using IF tag in XML, as explained above. Various operators may be used to determine whether or not the condition is satisfied during the runtime.

In the present embodiment, the instructions may affect, not only the "entry page," but affects the layout and theme of all portal pages displayed to the user. The instructions may be used to customize portal pages displayed to a user according to the client type used to access the portal For example, if a user uses a portable handheld device (e.g., PDA or mobile phone) to access the portal, then simplified versions of portal pages are presented to the portable device, e.g., only a single column and small font sizes are used for the displayed pages.

Figure 4B:
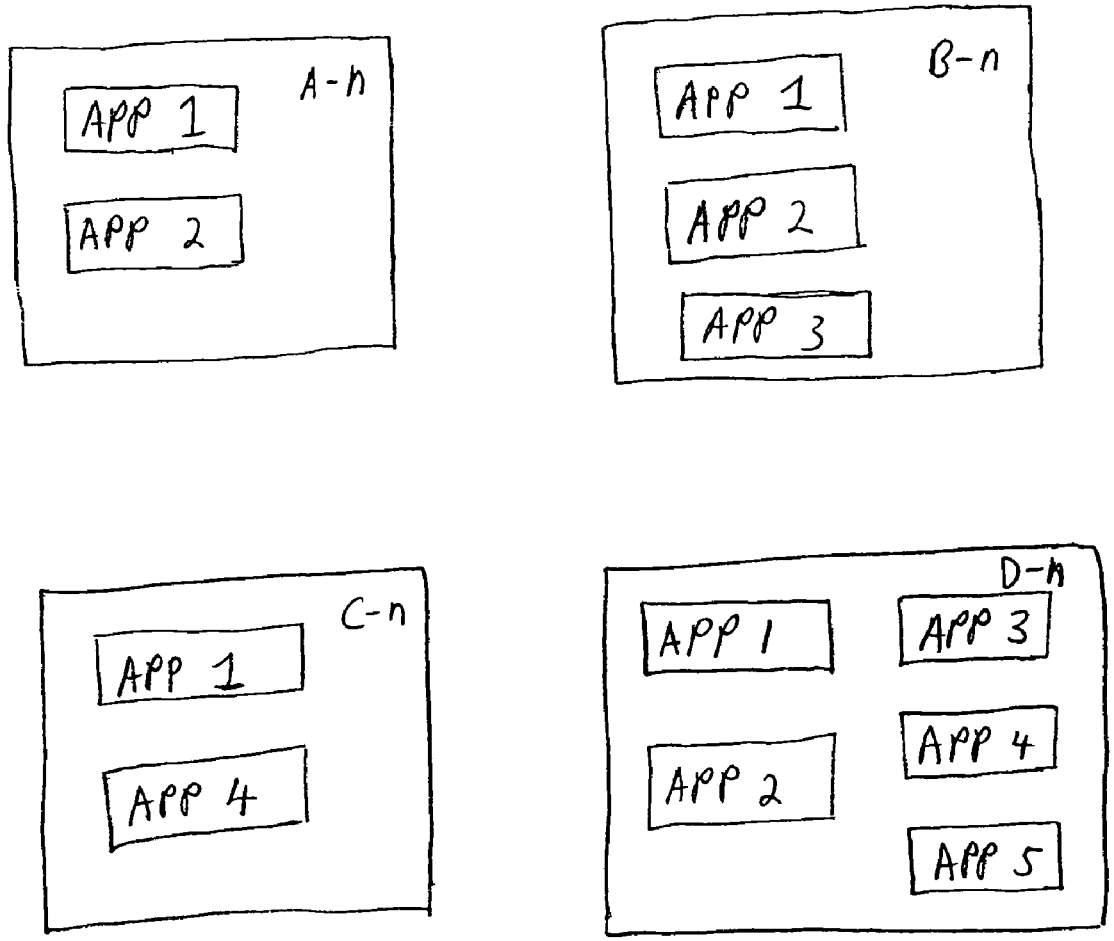
FIG. 4B illustrates portal pages presented to users according to one embodiment of the present invention.

Referring to FIG. 4B, the instructions may also be used to provide certain applications and portal components, e.g., iViews, to given users. That is, the portal system may allow different sets of applications to be made available to different users according to the conditions tags checked by the parser during runtime.

All portal pages A-n provided to a user group 1 according to instruction A provide access to only applications 1 and 2 (steps 406 and 408). All portal pages B-n provided to a user group 2 according to instruction B allows only applications 1, 2, and 3 to be accessed (steps 412 and 414). All portal pages C-n provided to a user group 3 according to instruction 3 allow applications 1 and 4. All portal pages D-n provided to a user group 4 according to instruction D allow applications 1, 2, 3, 4, and 5.

In one embodiment, the license fees for business applications made available to an enterprise is based on the number of people in each group. For example, if 10,000 people are included in the user group 1, only license fee for 10,000 is paid for applications 1 and 2. Similarly, if 5,000 people are included in the user group 3, the license fee for 5,000 is paid for the applications 1, 2, and 3. Accordingly, the resolver service may used to easily calculate the license fees for various applications made available to enterprises.

In addition, the resolver service enables the conditions to be easily modified or expanded the parser which resolves the conditions does not have any hard coded conditions inside it in the present embodiment. For example, if an administrator wishes to add a new condition, "if <group>==sales_men then desktop=sales," This could be added using few key strokes. During runtime, if the input is "group=sale_men," then the service returns "sales".

Moreover, the resolver service enables very quick decision making process since nested if tags may be used. For example, if a business has 100,000 employees that may access the portal. Customized portal pages may be provided for each user very quickly by using nested if tags. That is, instead of having to check 100,000 times for the user identity, employees may be grouped to 10,000 users at a time. Each of these groups are then divided into 10 subgroups, and so on.

Figure 5A:
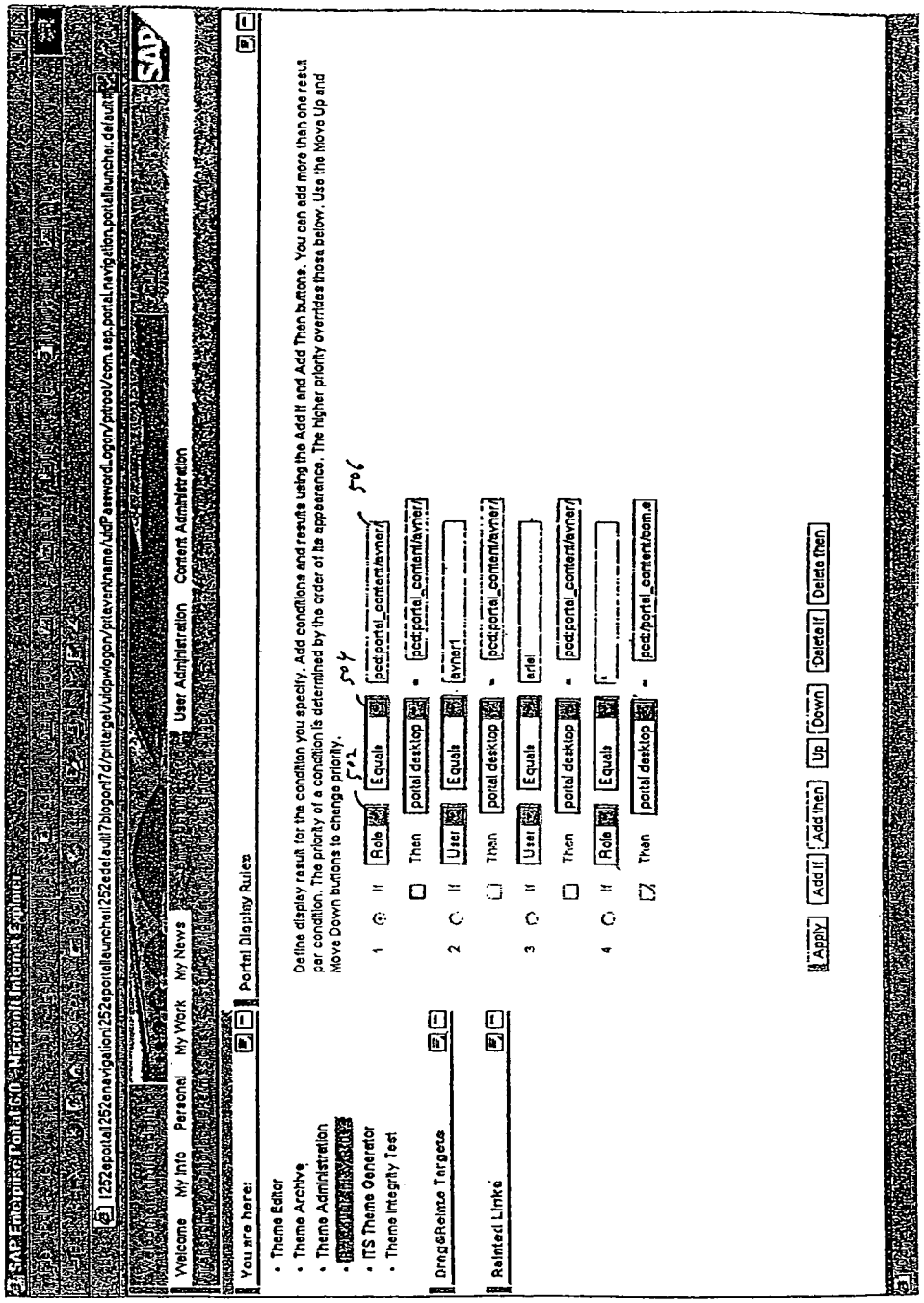
FIG. 5A illustrates a user interface provided by an editor of the resolver service according to one embodiment of the present invention.
Figure 5B:
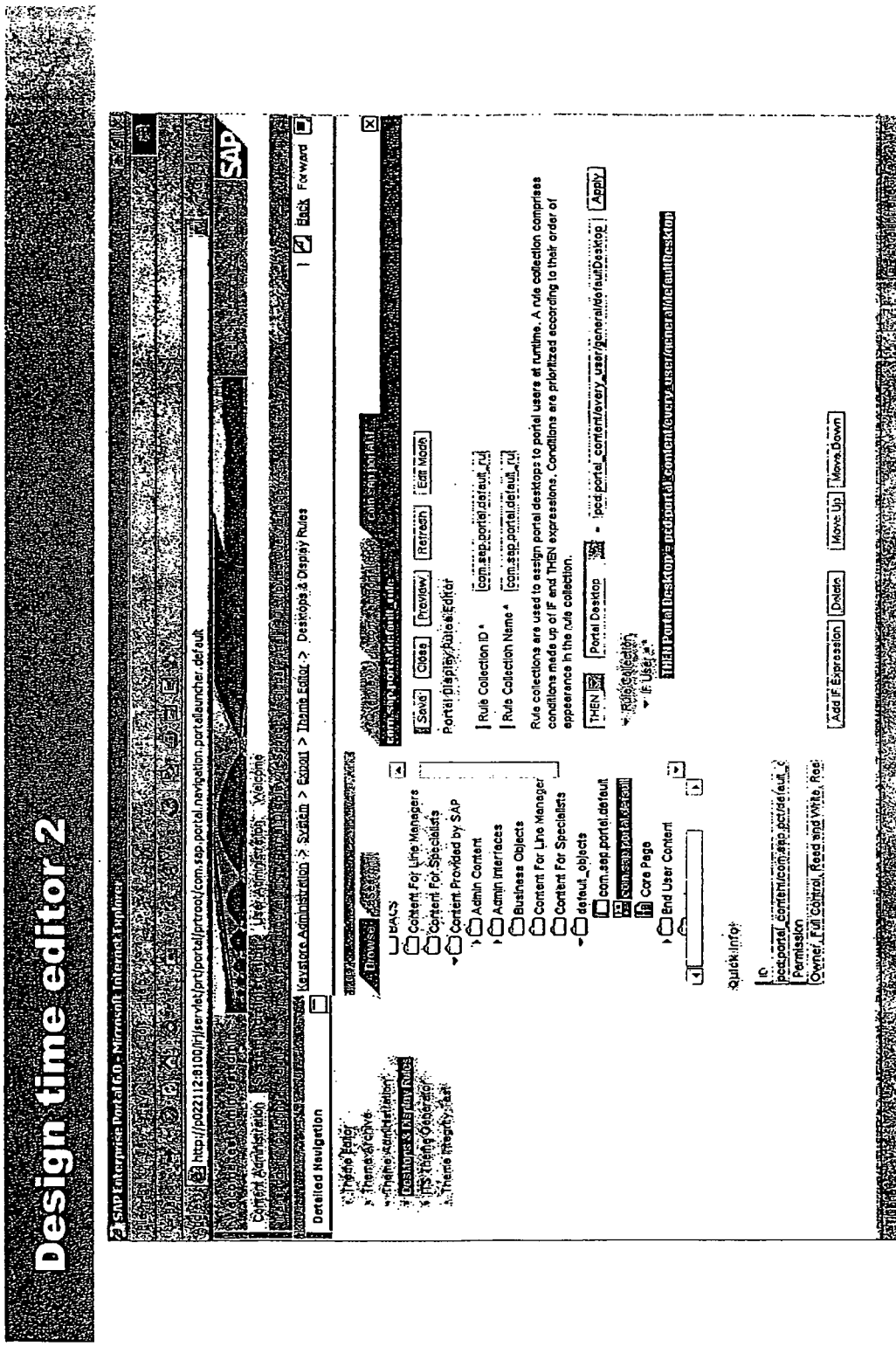
FIG. 5B illustrates a user interface provided by an editor of the resolver service according to another embodiment of the present invention.

FIG. 5A illustrates a user interface provided by the editor 302 according to one embodiment of the present invention. An administrator defines conditions by making selections on selections bars 502 and 504. If the condition is met the instruction associated with a return value 506 is performed. FIG. 5B illustrates a user interface provided by the editor according to another embodiment of the present invention.

The present invention has been described in terms of specific embodiments. As will be understood by those skilled in the art, the embodiments illustrated above may be modified, altered, and changed without departing from the scope of the present invention. The scope of the present invention is defined by the appended claims.

What is claimed is:

1. A method for presenting information to a plurality of client systems that are coupled to an enterprise portal, the method comprising:

receiving from an administrator, via a graphical user interface, first, second, and third predefined conditions, including at least one nested relationship between the conditions, and first, second, and third instructions, each instruction being associated with a set of portal pages;

receiving at the portal a run-time request from a first user associated with a first client system;

providing information associated with the request to a resolver service;

executing at the resolver service a decision process, comprising:

determining whether or not the request satisfies the first predefined condition, modifying behavior of the portal according to the first instruction if the request satisfies the first predefined condition such that the portal will provide pages from the first set of portal pages to the first user, if the request does not satisfy the first predefined condition, determining whether or not the request satisfies the second predefined condition, modifying behavior of the portal according to the second instruction if the request satisfies the second predefined condition such that the portal will provide pages from the second set of portal pages, and modifying behavior of the portal according to the third instruction if the request satisfies neither the first nor second predefined conditions such that the portal will provide pages from the third set of portal pages;

receiving from the resolver service an indication of modified portal behavior; and providing an appropriate portal page to the first user via the first client device in accordance with the indication of modified portal behavior.

2. The method of claim 1, wherein the first, second, and third conditions are defined using first and second condition tags, respectively, in Extended Markup Language (XML).

3. The method of claim 1, wherein the first condition relates to a role of the first user and the second condition relates to an identity of the first user.

4. The method of claim 1, wherein the first condition is defined using an operator, the operator including equal to, not equal to, less than and greater than.

5. The method of claim 4, wherein the operator further includes OR or AND functions.

6. The method of claim 1, wherein the first condition defines a first group of users, wherein the first condition is satisfied if the first user belongs to the first group and is not satisfied if the first user belongs to a second group that is different than the first group.

7. A portal system for providing customized portal pages to clients, the portal system comprising:

means for receiving from an administrator, via a graphical user interface, first, second, and third predefined conditions, including at least one nested relationship between the conditions, and first, second, and third instructions, each instruction being associated with a set of portal pages;

means for receiving at the portal a run-time request from a first user associated with a first client system;

means for providing information associated with the request to a resolver service;

means for executing at the resolver service a decision process, comprising:

means for determining whether or not the request satisfies the first predefined condition, means for modifying behavior of the portal according to the first instruction if the request satisfies the first predefined condition such that the portal will provide pages from the first set of portal pages to the first user, if the request does not satisfy the first predefined condition, means for determining whether or not the request satisfies the second predefined condition, means for modifying behavior of the portal according to the second instruction if the request satisfies the second predefined condition such that the portal will provide pages from the second set of portal pages, and means for modifying behavior of the portal according to the third instruction if the request satisfies neither the first nor second predefined conditions such that the portal will provide pages from the third set of portal pages;

means for receiving from the resolver service an indication of modified portal behavior; and means for providing an appropriate portal page to the first user via the first client device in accordance with the indication of modified portal behavior.

8. The portal system of claim 7, further comprising:

an editor for defining the first, second, and conditions during design time; and a resolver service parser for checking the conditions during runtime.

9. A method for operating a portal system, the method comprising:

providing a first instruction that is operable to cause the portal system to provide pages from a first set of portal pages;

providing a second instruction that is operable to cause the portal system to provide pages from a second set of portal pages;

providing a third instruction that is operable to cause the portal system to provide pages from a third set of portal pages;

defining a first condition, associated with a user role, using an editor;

associating the first condition with the first instruction;

defining a second condition, associated with a user identifier, using the editor;

associating the second condition with the second instruction;

including at least one nested relationship between the conditions, each instruction being associated with a set of portal pages;

receiving a request from a client system at the portal system for a session to access the portal system, the request being associated with given user information;

determining whether or not the first condition is satisfied using the user information associated with the request;

modifying behavior of the portal system according to the first instruction if the first condition is satisfied, wherein the portal system provide pages from the first set of portal pages for an entire session; and if the first condition is not satisfied:

determining whether or not the second condition is satisfied using the user information associated with the request; and modifying behavior of the portal system according to the second instruction if the second condition is satisfied, wherein the portal system provide pages from the second set of portal pages for an entire session;

if neither first nor the second conditions are satisfied:

modifying behavior of the portal system according to the third instruction if the request satisfies neither the first nor second predefined conditions such that the portal system will provide pages from the third set of portal pages for an entire session.

10. The method of claim 9, wherein the first condition is defined within a condition tag in Extended Markup Language (XML), and wherein the first instruction is associated with a value that is returned if the first condition is satisfied.

11. A computer readable medium including a computer program for portal system operation, the computer program comprising:

code for providing a first instruction that is operable to cause the portal system to provide pages from a first set of portal pages;

code for providing a second instruction that is operable to cause the portal system to provide pages from a second set of portal pages;

providing a third instruction that is operable to cause the portal system to provide pages from a third set of portal pages;

code for defining a first condition, associated with a user role, using an editor;

code for associating the first condition with the first instruction;

code for defining a second condition, associated with a user identifier, using the editor;

code for associating the second condition with the second instruction;

code for including at least one nested relationship between the conditions, each instruction being associated with a set of portal pages;

code for receiving a request from a client system at the portal system for a session to access the portal system, the request being associated with given user information;

code for determining whether or not the first condition is satisfied using the user information associated with the request;

code for modifying behavior of the portal system according to the first instruction if the first condition is satisfied, wherein the portal system provide pages from the first set of portal pages for an entire session; and if the first condition is not satisfied:

code for determining whether or not the second condition is satisfied using the user information associated with the request; and code for modifying behavior of the portal system according to the second instruction if the second condition is satisfied, wherein the portal system provide pages from the second set of portal pages for an entire session; and if neither the first nor the second conditions are satisfied:

code for determining if neither the first nor the second conditions are satisfied using the user information associated with the request; and code for modifying behavior of the portal system according to the third instruction if neither the first nor second conditions are satisfied, wherein the portal system provide pages from the third set of portal pages for an entire session.

* * * * *